US012607295B2

(12) United States Patent
Bentsen

(10) Patent No.: US 12,607,295 B2
(45) Date of Patent: Apr. 21, 2026

(54) INSPECTION SYSTEM INCLUDING A SELF-STABILIZING ASSEMBLY

(71) Applicant: Interactive Aerial, Inc., Traverse City, MI (US)

(72) Inventor: Justin Bentsen, Traverse City, MI (US)

(73) Assignee: Nexxis Technology PTY Ltd, O'Connor (AU)

( * ) Notice: Subject to any disclaimer, the term of this patent is extended or adjusted under 35 U.S.C. 154(b) by 988 days.

(21) Appl. No.: 16/996,585

(22) Filed: Aug. 18, 2020

(65) Prior Publication Data

US 2021/0088632 A1 Mar. 25, 2021

Related U.S. Application Data

(60) Provisional application No. 63/015,196, filed on Apr. 24, 2020, provisional application No. 62/903,002, filed on Sep. 20, 2019.

(51) Int. Cl.
*F16M 11/32* (2006.01)
*F16M 11/18* (2006.01)

(52) U.S. Cl.
CPC ............. *F16M 11/32* (2013.01); *F16M 11/18* (2013.01); *F16M 2200/041* (2013.01)

(58) Field of Classification Search
CPC .......... B64G 1/283–286; F16M 2200/041–047
See application file for complete search history.

(56) References Cited

U.S. PATENT DOCUMENTS

| | | | | | |
|---|---|---|---|---|---|
| 3,210,114 | A | * | 10/1965 | Lawton | B66C 13/08 |
| | | | | | 414/754 |
| 6,926,120 | B1 | * | 8/2005 | Bradley | E06C 7/16 |
| | | | | | 182/129 |
| 7,035,758 | B1 | * | 4/2006 | Jerome | B66C 23/18 |
| | | | | | 702/150 |
| 7,905,463 | B2 | | 3/2011 | Burnham et al. | |
| 8,199,197 | B2 | * | 6/2012 | Bennett | F16M 11/105 |
| | | | | | 348/61 |
| 10,001,425 | B1 | | 6/2018 | Olsson et al. | |
| 10,143,930 | B2 | * | 12/2018 | D'Andrea | F16M 11/045 |
| 11,370,642 | B2 | * | 6/2022 | Markwell | B66C 13/16 |
| 2018/0136144 | A1 | | 5/2018 | Blunk | |
| 2018/0194467 | A1 | | 7/2018 | Hoheisel et al. | |
| 2018/0194490 | A1 | | 7/2018 | Chen | |
| 2019/0118971 | A1 | | 4/2019 | Zwaan et al. | |
| 2019/0187069 | A1 | | 6/2019 | Tolås et al. | |
| 2019/0219425 | A1 | | 7/2019 | Sar et al. | |
| 2019/0242696 | A1 | | 8/2019 | McAleenan et al. | |
| 2023/0145885 | A1 | * | 5/2023 | Plancke | G01N 21/954 |
| | | | | | 345/420 |

FOREIGN PATENT DOCUMENTS

| | | | | | |
|---|---|---|---|---|---|
| CN | 109723128 | A | * | 5/2019 | |
| JP | 2016092654 | A | * | 5/2016 | H04N 5/225 |

* cited by examiner

*Primary Examiner* — Leon W Rhodes, Jr.
(74) *Attorney, Agent, or Firm* — Traverse Legal, PLC

(57) ABSTRACT

An inspection system including a self-stabilizing assembly for carrying and controlling the movement of a payload device. The system also comprises a support assembly for supporting the weight and maintaining the stability of the self-stabilizing assembly. The system also comprises a controller for controlling the movement and direction of the self-stabilizing assembly.

7 Claims, 19 Drawing Sheets

FIG. 5
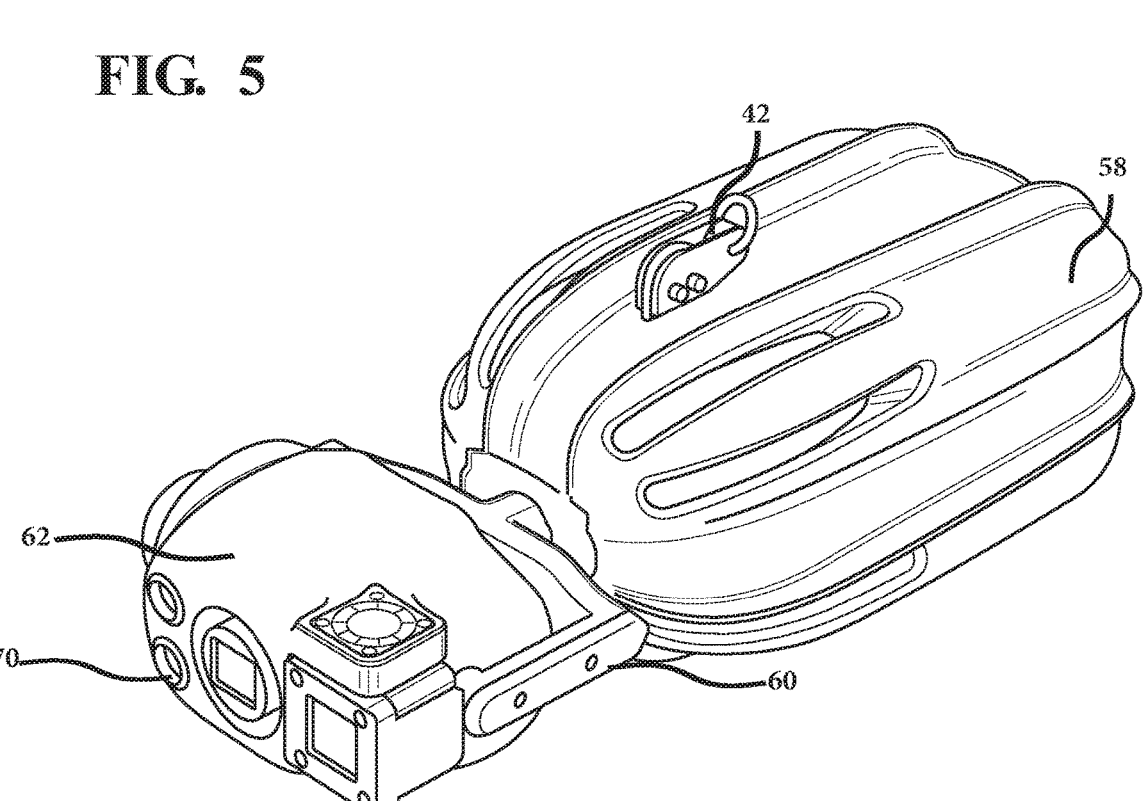
FIG. 6
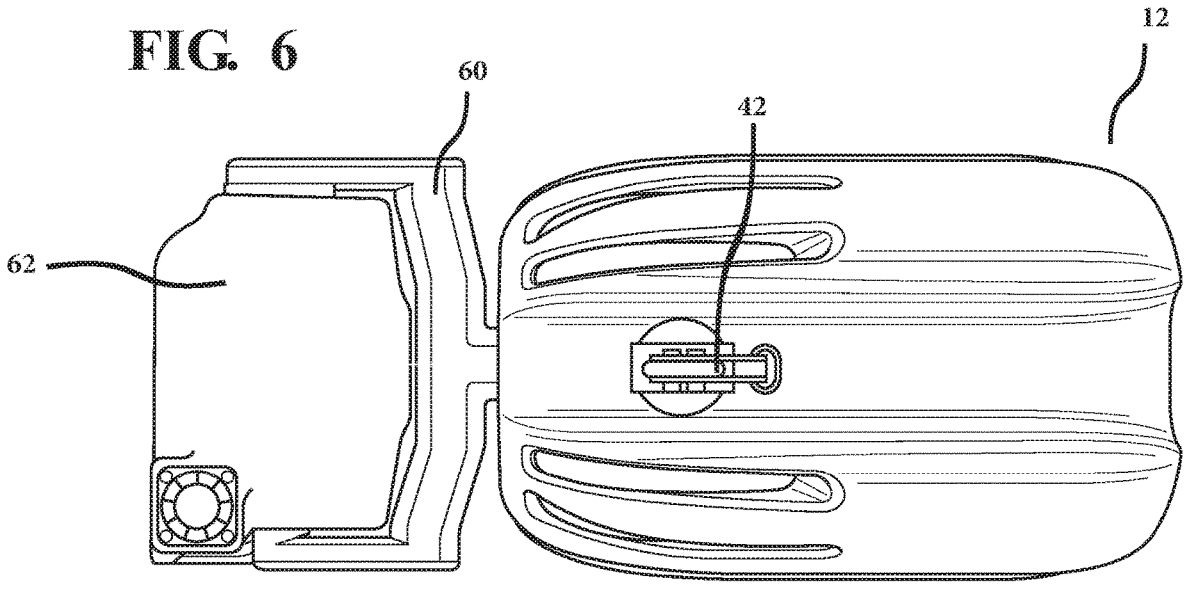

FIG. 18

INSPECTION SYSTEM INCLUDING A SELF-STABILIZING ASSEMBLY

CROSS REFERENCE TO RELATED APPLICATIONS

The present application claims the benefit to U.S. Provisional Patent Application No. 62/903,002 filed on Sep. 20, 2019 and U.S. Provisional Patent Application No. 63/015,196 filed on Apr. 24, 2020, which are incorporated herein by reference in their entireties.

FIELD

The present disclosure generally relates to an inspection system including a self-stabilizing assembly for carrying a payload and a support assembly.

BACKGROUND

In various fields, such as videography, photography, sensing, and/or surveillance, a moveable object is typically used for carrying a payload device, such as an imaging device (e.g., camera, video camera) or the like. When the moveable object is in motion, the payload device may be subject to movement, which affects the operation of the payload device. Movement of the payload device will typically affect the operation of any type of sensor on the payload device, such as a LIDAR sensor, a gas detection sensor, a camera, etc. For example, sudden and abrupt movements of the payload device often result in poor quality images acquired by the imaging device.

Controlling the movement of a payload device is particularly important when the moveable object is used for conducting vertical, confined space inspections in various structures or buildings, such as elevator shafts, silos, towers, pylons, bridges, etc. The moveable object must be able to stabilize itself while being deployed into confined spaces. In other words, the moveable object must minimize the "rigidity in space" or influences from various external forces, such as wind, twisting cables, and other moving parts connected to the moveable object.

SUMMARY

What is provided is an inspection system including a self-stabilizing assembly for carrying and controlling the movement of a payload device. The system also comprises a support assembly for supporting the weight and maintaining an accurate means of height control for the self-stabilizing assembly.

In an embodiment, the inspection system includes a first assembly having a housing; one or more rotatable members positioned within the housing, wherein the rotatable members are configured to generate torque and control the heading the first assembly; one or more motors coupled to the rotatable members, wherein the motors are configured to control the rotation of the rotatable members; a payload support structure pivotally attached to the housing; and a payload device mounted within the payload support structure, wherein the payload support structure is configured to stabilize and control the movement of the payload device. The inspection system also includes a second assembly connected to the first assembly, wherein the second assembly has a support stand configured to support the first assembly; an elongated arm pivotally attached to the support stand; and a winch assembly positioned on top of the support stand and attached to the elongated arm, wherein the winch assembly comprises a winch cable extending along the elongated arm and connected to the first assembly, and wherein the winch cable is configured to raise and lower the first assembly. The inspection system further includes a wireless controller for controlling the movement and direction of the first assembly.

In another embodiment, the self-stabilizing assembly includes a housing; a triple-axis wheel unit assembly positioned within the housing, wherein the wheel unit assembly is configured to control and stabilize the self-stabilizing assembly. The wheel unit assembly includes a first motor drivingly coupled to a first rotational wheel; a second motor drivingly coupled to a second rotational wheel; and a third motor drivingly coupled to a third rotational wheel; wherein each of the rotational wheels is configured to rotate in an orthogonal direction to the other rotational wheels. The self-stabilizing also includes a payload support structure pivotally attached to the housing; and a payload device mounted within the payload support structure, wherein the payload support structure is configured to stabilize and control the movement of the payload device.

In some embodiments, the support stand is a tripod with a plurality of pin locking locations.

In some embodiments, the payload device is a camera.

In an embodiment, a bearing is positioned on top of the housing of the first assembly, and the bearing is attached to the winch cable.

In an embodiment, the self-stabilizing assembly comprises a LIDAR scanner attached to the housing.

In some embodiments, the rotational wheel are reaction wheels, momentum wheels, or gyroscopic wheels.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 illustrates a schematic perspective view of the self-stabilizing assembly illustrated in FIGS. 1-4;

FIG. 6 illustrates a schematic top view of the self-stabilizing assembly illustrated in FIGS. 1-5;

FIG. 18 illustrates a schematic top sectional view of the self-stabilizing assembly illustrated in FIGS. 1-10;

DETAILED DESCRIPTION

It is to be understood that the present disclosure may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Systems, assemblies, and methods for stabilizing and supporting a payload device are provided herein. In some embodiments, the payload device may include an imaging device, such as a video camera or a camera, and/or a non-imaging device, such a microphone. The systems disclosed herein may be used for a variety of applications, including, but not limited to inspecting a building/structure, surveying one or more targets, and/or capturing images and/or videos. As seen in the figures of this disclosure, the systems are used to inspect vertically confined spaces, such as elevators shafts, silos, towers, and bridge pylons.

FIGS. 1-18 illustrate views of a system 10 including a self-stabilizing assembly 12 and a support assembly 14 according to an embodiment of the disclosure. The support assembly 14 comprises a stand used as a platform for supporting the weight and maintaining the stability of the self-stabilizing assembly 12. In the embodiment shown in FIGS. 1-16, the stand comprises a tripod 16 that provides support to the self-stabilizing assembly 12 against downward forces and horizontal forces and movement. The tripod 16 may be positioned on the top of an asset, such as on or near the roof of a building/structure or on/near a manway.

Figure 13:
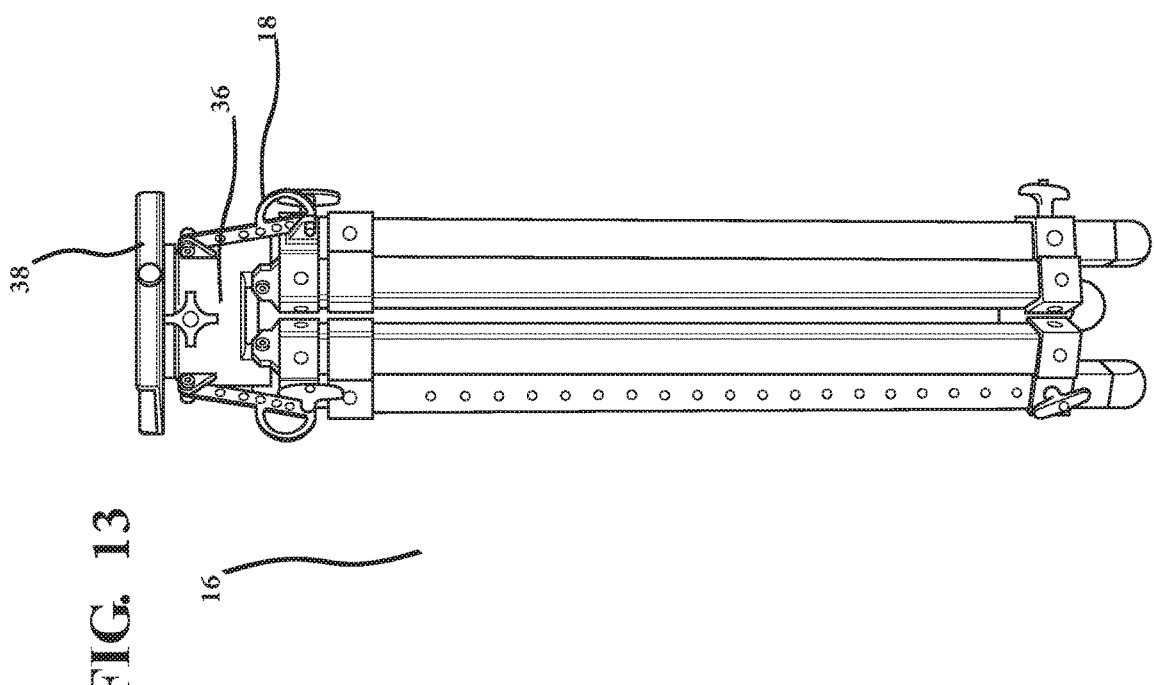
FIG. 13 illustrates a schematic perspective view of the tripod illustrated in FIG. 11, wherein the tripod is in a folded position.
Figure 12:
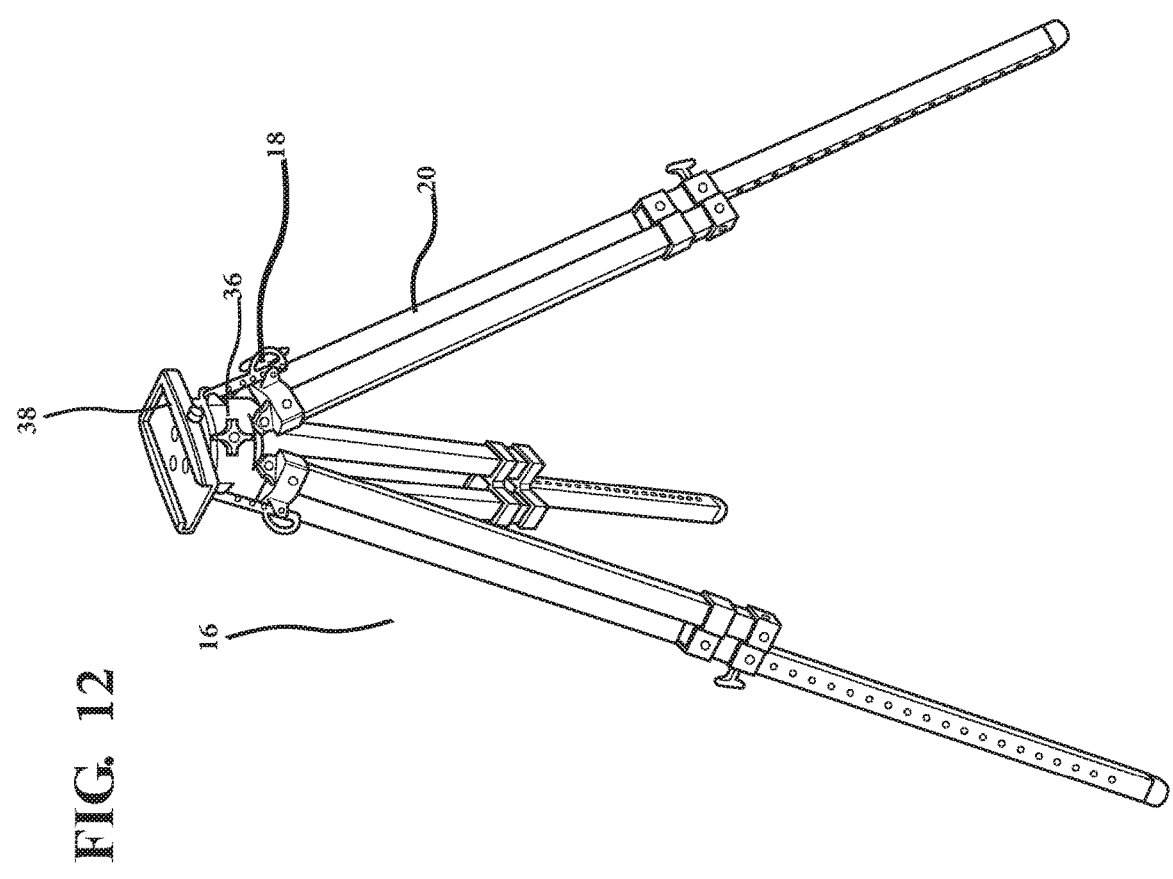
FIG. 12 illustrates a schematic perspective view of a tripod of the support assembly illustrated in FIGS. 1-4, wherein the tripod is in an extended position.
Figure 14:
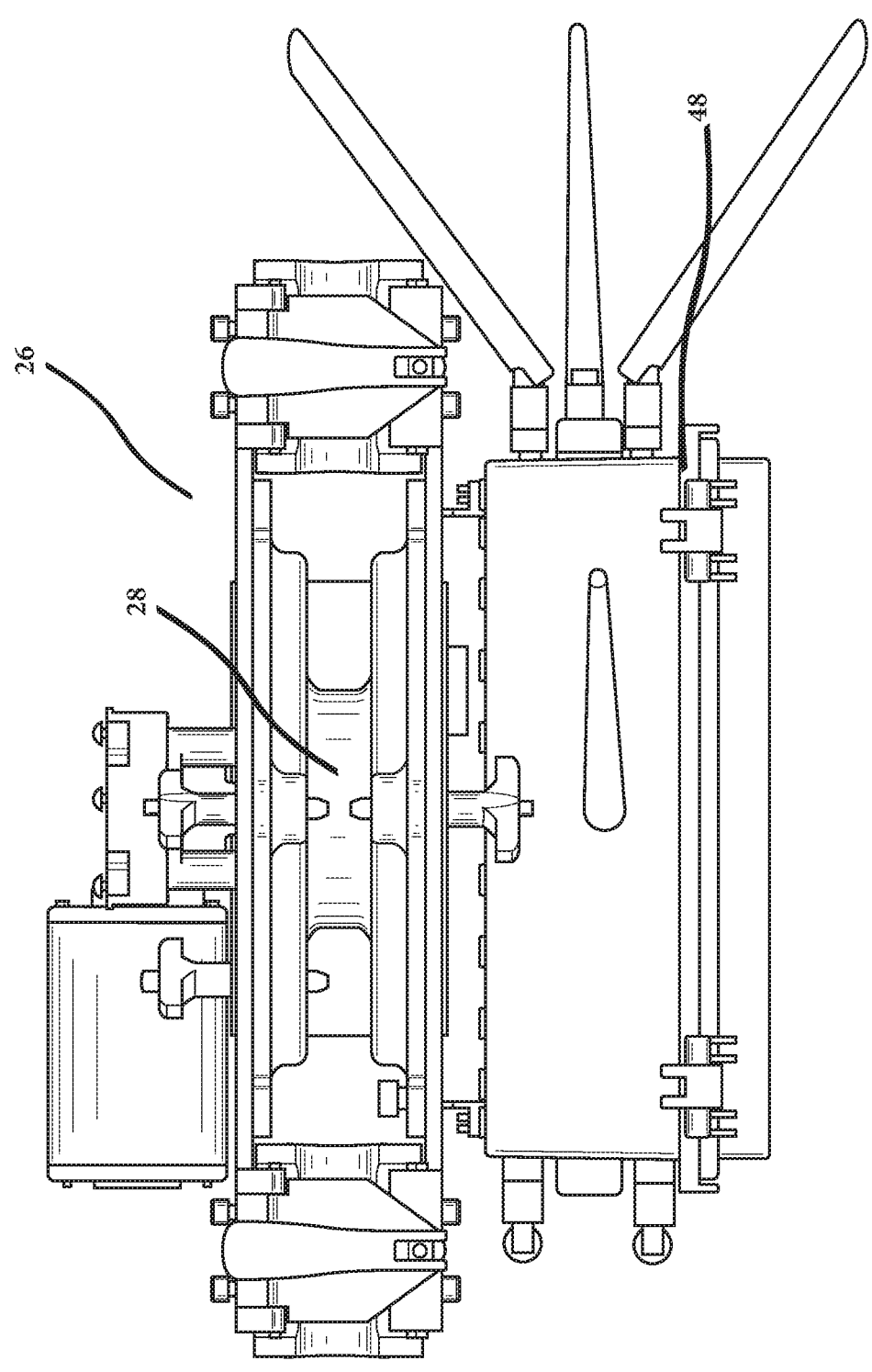
FIG. 14 illustrates a schematic top perspective view of a portion of the support assembly illustrated in FIGS. 1-3.

As best seen in FIGS. 12 and 13, the tripod 16 includes a plurality of pin locking locations 18 that allow the tripod 16 to have a variety of configurations and attachment positions, including being fully extended and fully folded. The pin locking locations 18 are positioned on upper portions of one or more telescoping legs 20 on the tripod 16. In some embodiments, the legs 20 are configured to act as pin locks that lock to specific lengths in order to allow for incremental height adjustments. As a result, the one or more legs 20 may each be locked into a desired angle or securely laid across a hole.

Figure 4:
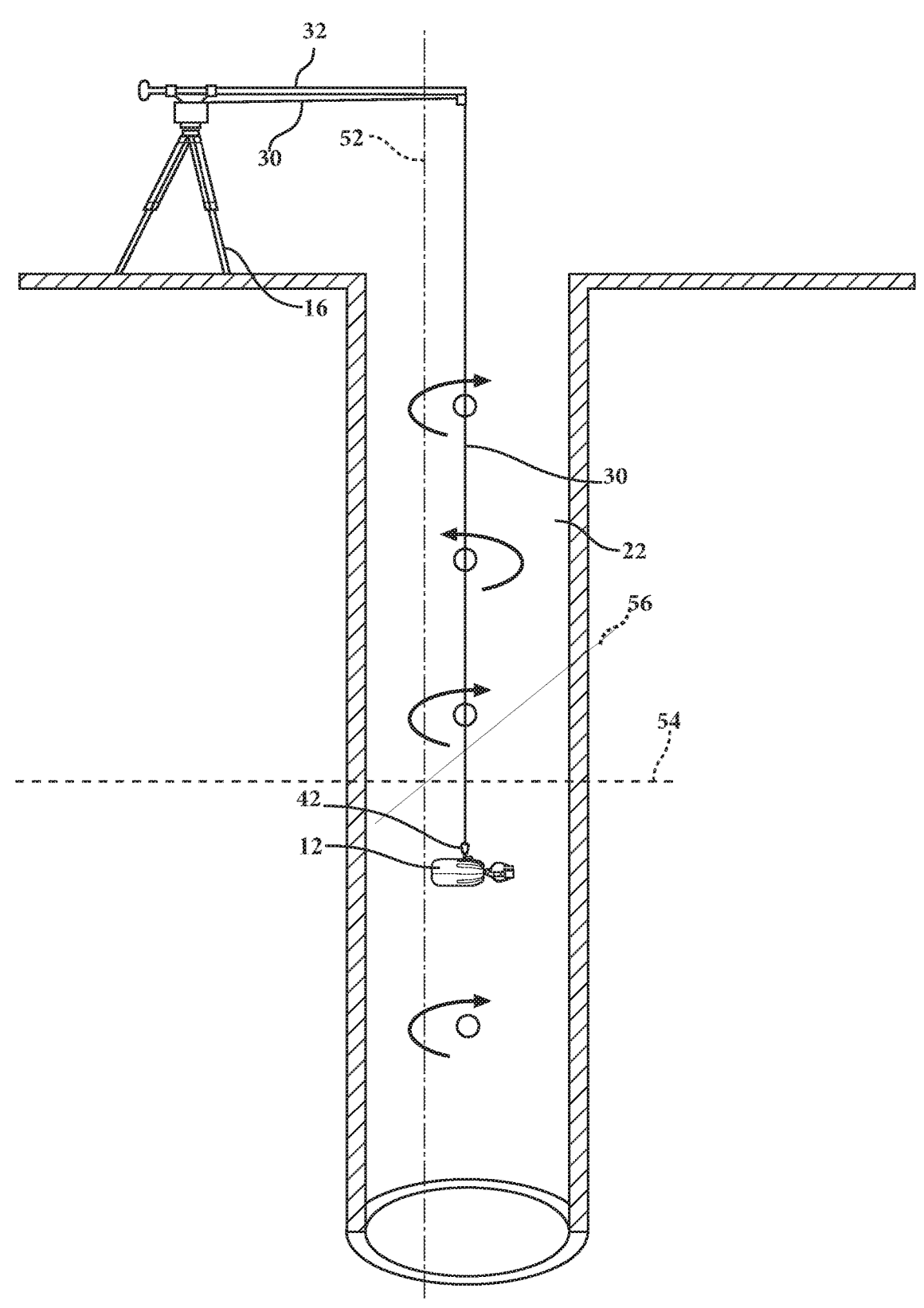
FIG. 4 illustrates a schematic view of the system illustrated in FIGS. 1-3, wherein the self-stabilizing assembly is deployed into a space.
Figure 7:
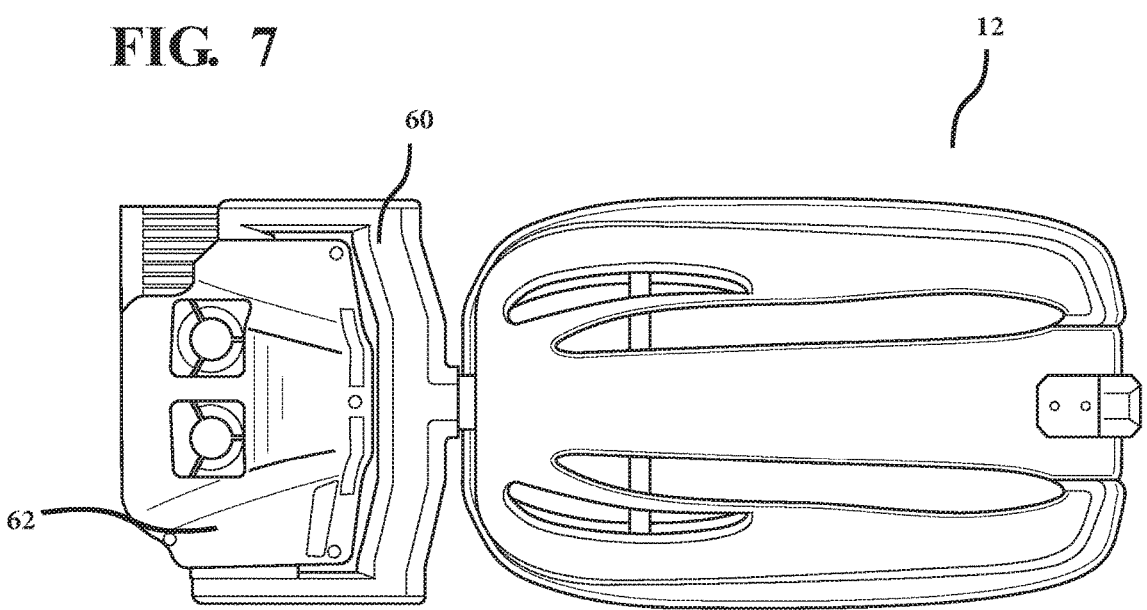
FIG. 7 illustrates a schematic bottom view of the self-stabilizing assembly illustrated in FIGS. 1-6.
Figure 8:
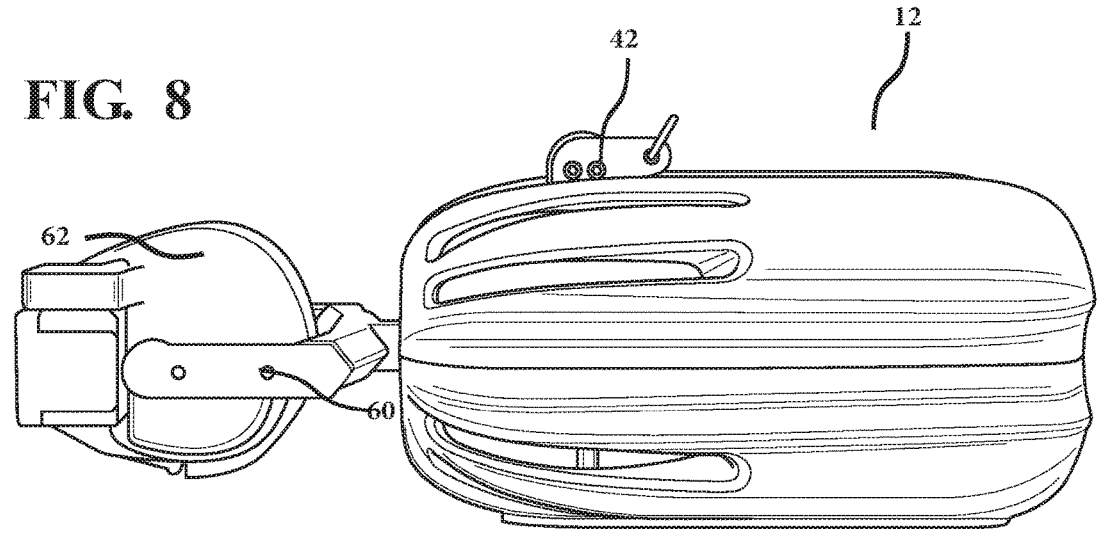
FIG. 8 illustrates a schematic side view of the self-stabilizing assembly illustrated in FIGS. 1-7.

The tripod 16 provides support to the self-stabilizing assembly 12 against downward and horizontal forces and movement. As best seen in FIG. 4, the tripod 16 allows the self-stabilizing assembly 12 to be deployed down and raised up from an enclosed space 22 without needing to position an operator directly over an opening leading down into the space 22. The tripod 16 may comprise a variety of materials, including aluminum.

Figure 17:
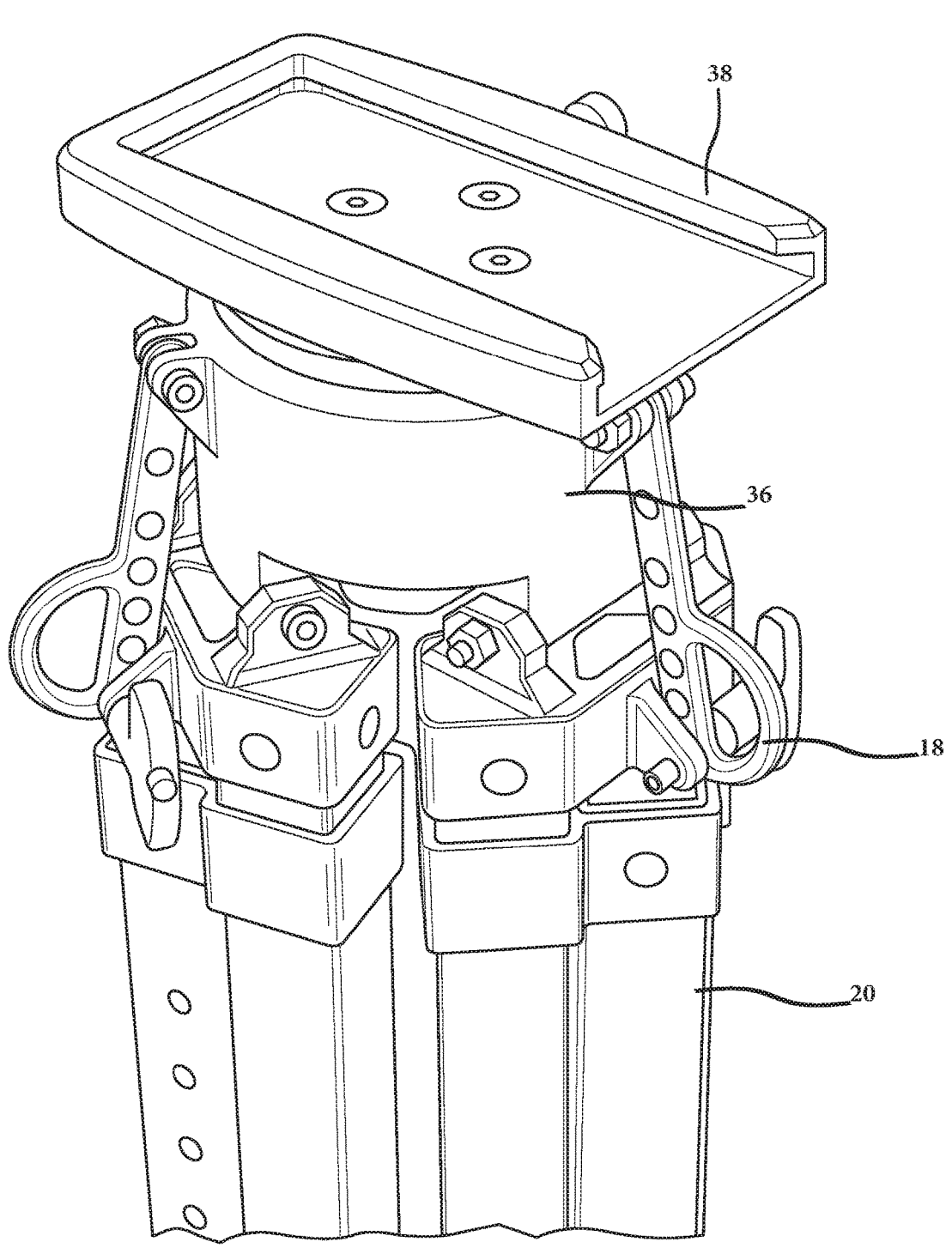
FIG. 17 illustrates a schematic perspective view of a receiver on the tripod illustrated in FIGS. 12 and 13.

As best seen in FIGS. 12, 13, and 17 and as a non-limiting example, the tripod 16 includes a top portion 36 having a receiver plate 38. The receiver plate 38 is configured to receive at least a portion of a winch assembly 26 and/or at least a portion of a controller mount 48. A portion of the winch assembly 26 and/or a portion of the controller mount 48 may be attached to the receiver plate 38 through a variety of ways, such as via a secure pin lock. The receiver plate 38 may have a variety of sizes and configurations as long as it can receive and secure at least a portion of the winch assembly 26.

As best seen in FIGS. 1, 2, and 14-16, the controller mount 48 is attached to the winch assembly 26 through a fastening means, such as a bolt, screw, or the like. The controller mount 48 includes an opening for receiving and securing a controller 50.

As best seen in FIGS. 1, 2, and 14-16, and as a non-limiting example, the winch assembly 26 comprises a rotatable winch spool 28 and a winch cable 30 wound on the winch spool 28. The winch spool 28 may be rotated through a crankshaft connected to the winch spool 28.

Figure 15:
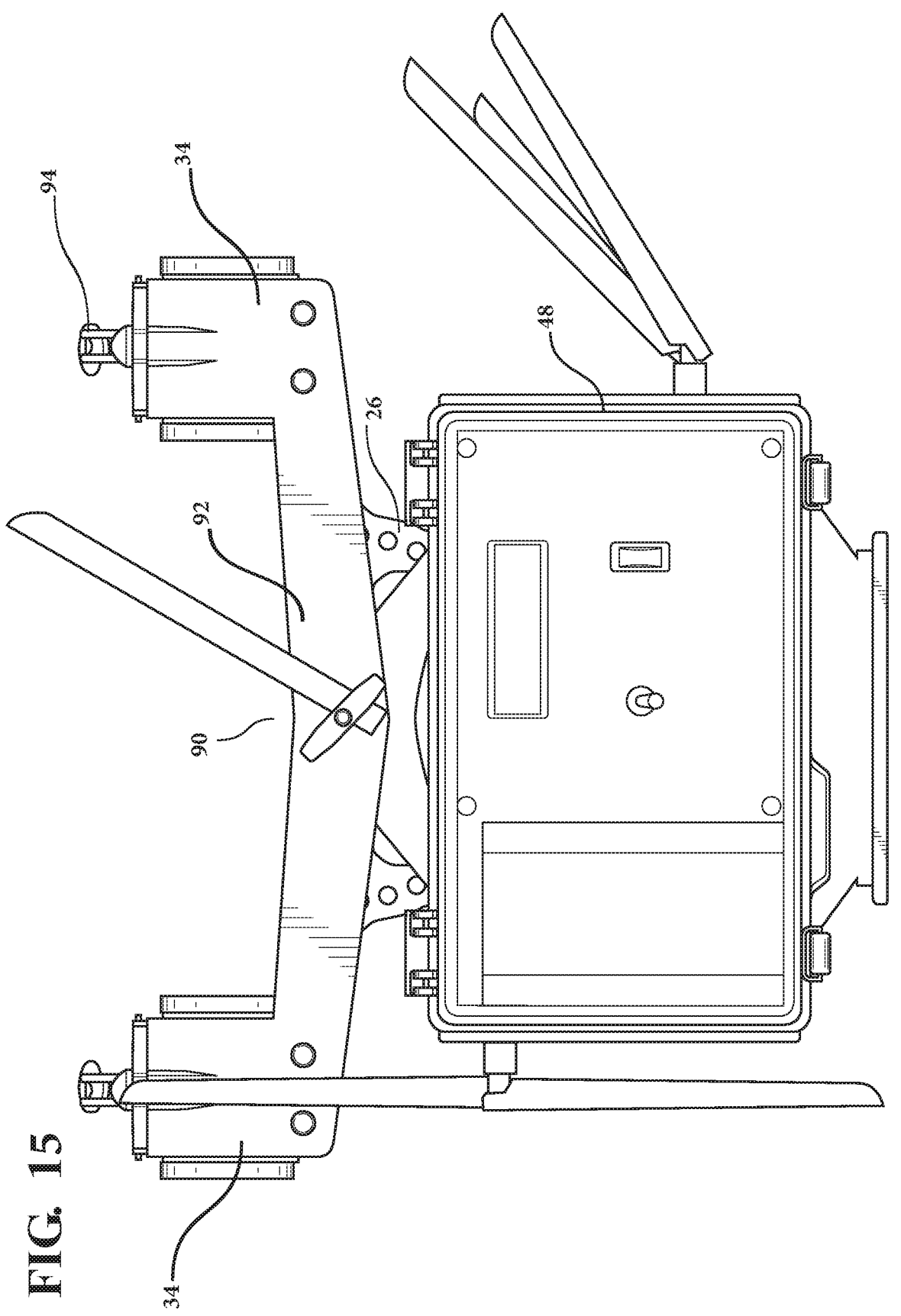
FIG. 15 illustrates another schematic side perspective view of the portion of the support assembly illustrated in FIG. 14.
Figure 16:
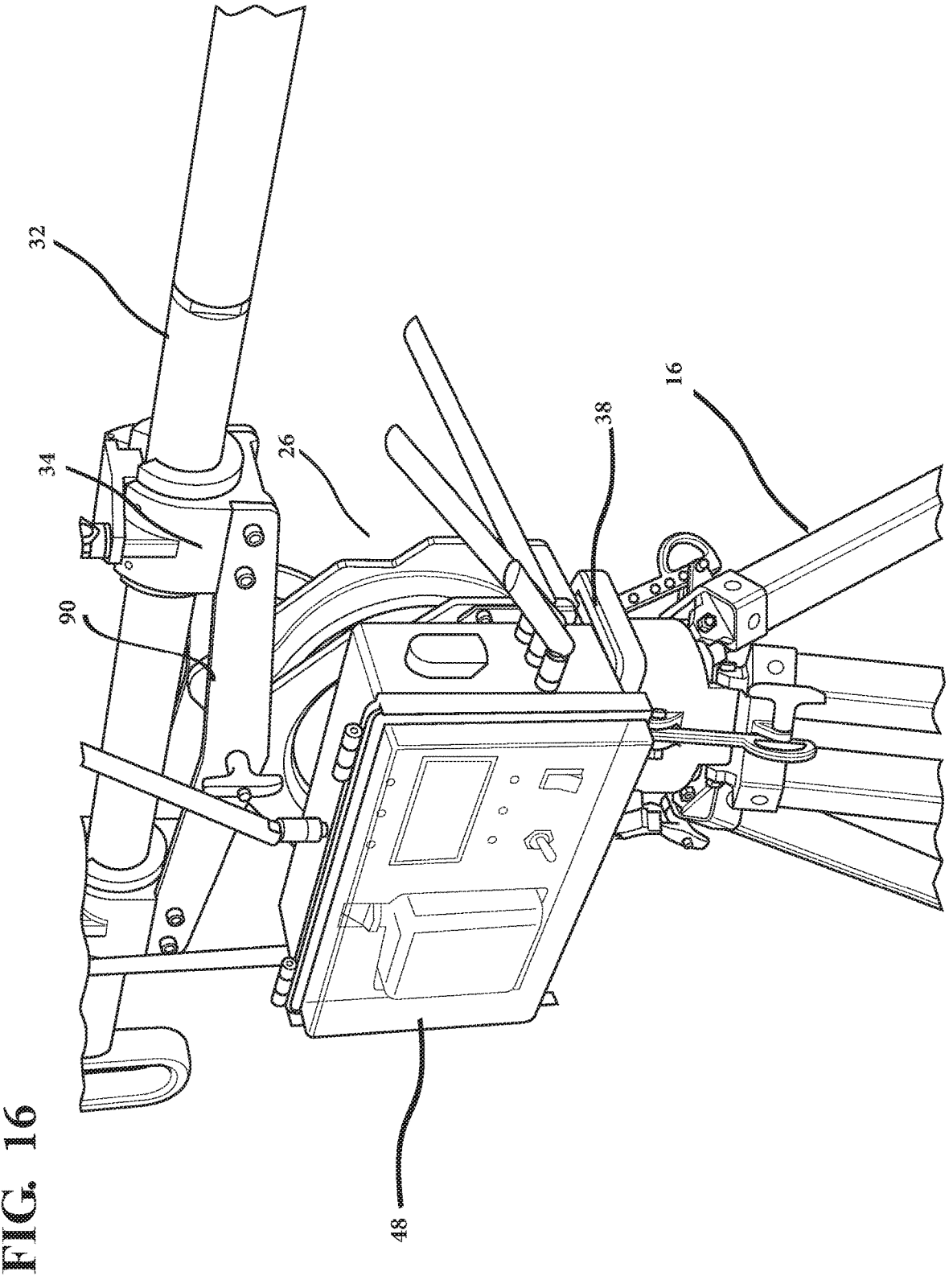
FIG. 16 illustrates an enlarged perspective view of a portion of the support assembly illustrated in FIGS. 1-3, 14, and 15.

As best seen in FIGS. 15 and 16 and as a non-limiting example, a fastening assembly 90 is attached on top of the winch assembly 26. In this embodiment, the fastening assembly 90 comprises two opposing fasteners 34, a lever 94 positioned on top of each of the fasteners 34, and an elongated middle portion 92 interposed between the two fasteners 34. The fastening assembly 90 may have a variety of suitable configurations and sizes, including being substantially U-shaped.

In an embodiment, each of the fasteners 34 are pivotally attached to one or more portions of the boom arm 32. The one or more portions of the boom arm 32 may be slidably inserted through each of the fasteners 32. The fastening assembly 90 is configured to allow an operator to vertically tilt one or more portions of the boom arm 32. The levers 94 are configured to lock the one or more portions of the boom arm 32 in place once the desired position is reached for the boom arm 32. In the embodiment shown in FIGS. 15 and 16, each of the fasteners 32 comprises linear bushings. One of ordinary skill in the art would understand that other types of fasteners may also be suitable in other embodiments.

The winch cable 30 extends along the boom arm 32 and connects to the self-stabilizing assembly 12, wherein the winch cable 30 is configured to raise and lower the self-stabilizing assembly 12. The boom arm 32 may be readily moved vertically and horizontally by an operator. In an embodiment, the boom arm 32 may be about 12 feet in length. The boom arm 32 is configured to allow the self-stabilizing assembly 12 to enter the space 22 without requiring the operator actually entering the space 22. As a result, the height of the self-stabilizing assembly 12 may be controlled by spooling the winch cable 30.

In an embodiment, the boom arm 32 comprises one integral pieces. In an alternative embodiment, the boom arm 32 comprises multiple pieces.

The winch assembly 26 is configured to function as a signal repeater allowing an operator to be up to 3,000 feet away from the tripod 16 while operating the self-stabilizing assembly 12. Since the weight of the self-stabilizing assembly 12 is fully supported by the winch cable 30, the self-stabilizing assembly 12 has a longer battery run time and inspections may be fully completed without the need to continually swap out batteries.

In an embodiment, a hand crank 40 is connected to an end of the boom arm 32. The hand crank 40 is configured to manually retract the winch cable 30 and the self-stabilizing assembly 12, as needed. One of ordinary skill in the art would understand that other mechanisms for retracting and/or pulling the winch cable 30 and the self-stabilizing assembly 12 may be used in other embodiments.

Figure 1:
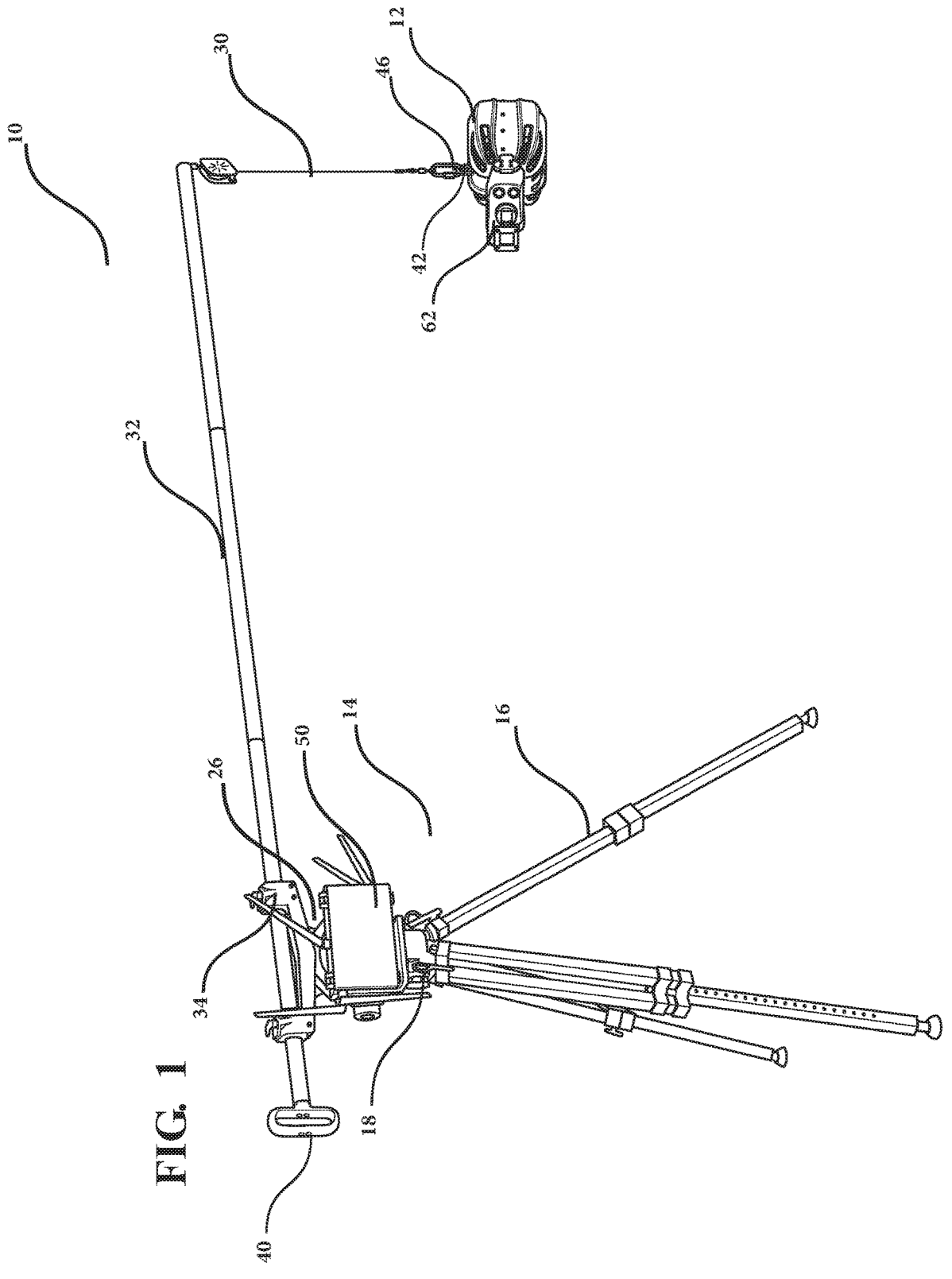
FIG. 1 illustrates a schematic perspective view of a system including a self-stabilizing assembly and a support assembly according to an embodiment of the disclosure.
Figure 2:
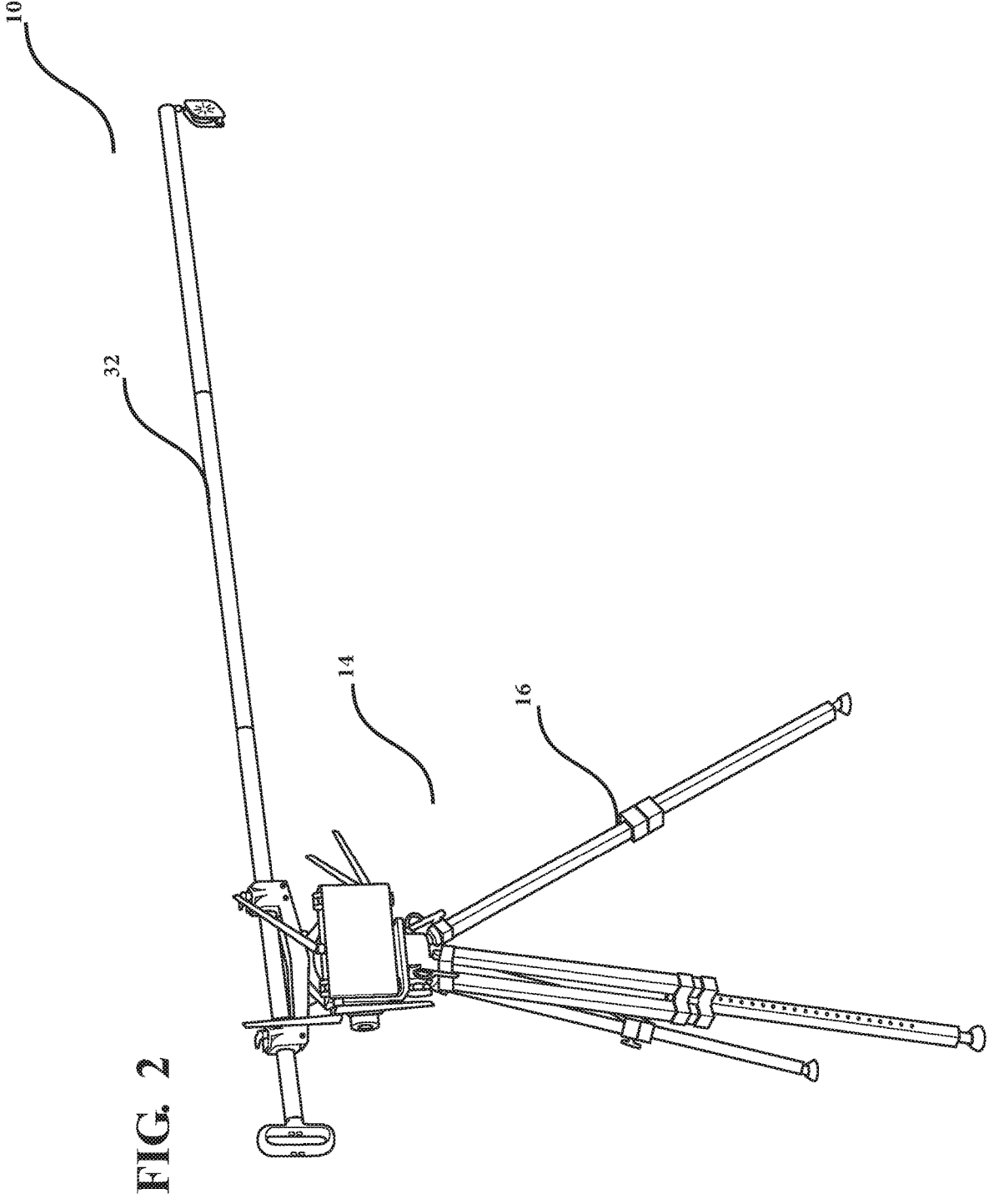
FIG. 2 illustrates a schematic perspective view of a portion of the system illustrated in FIG. 1.
Figure 9:
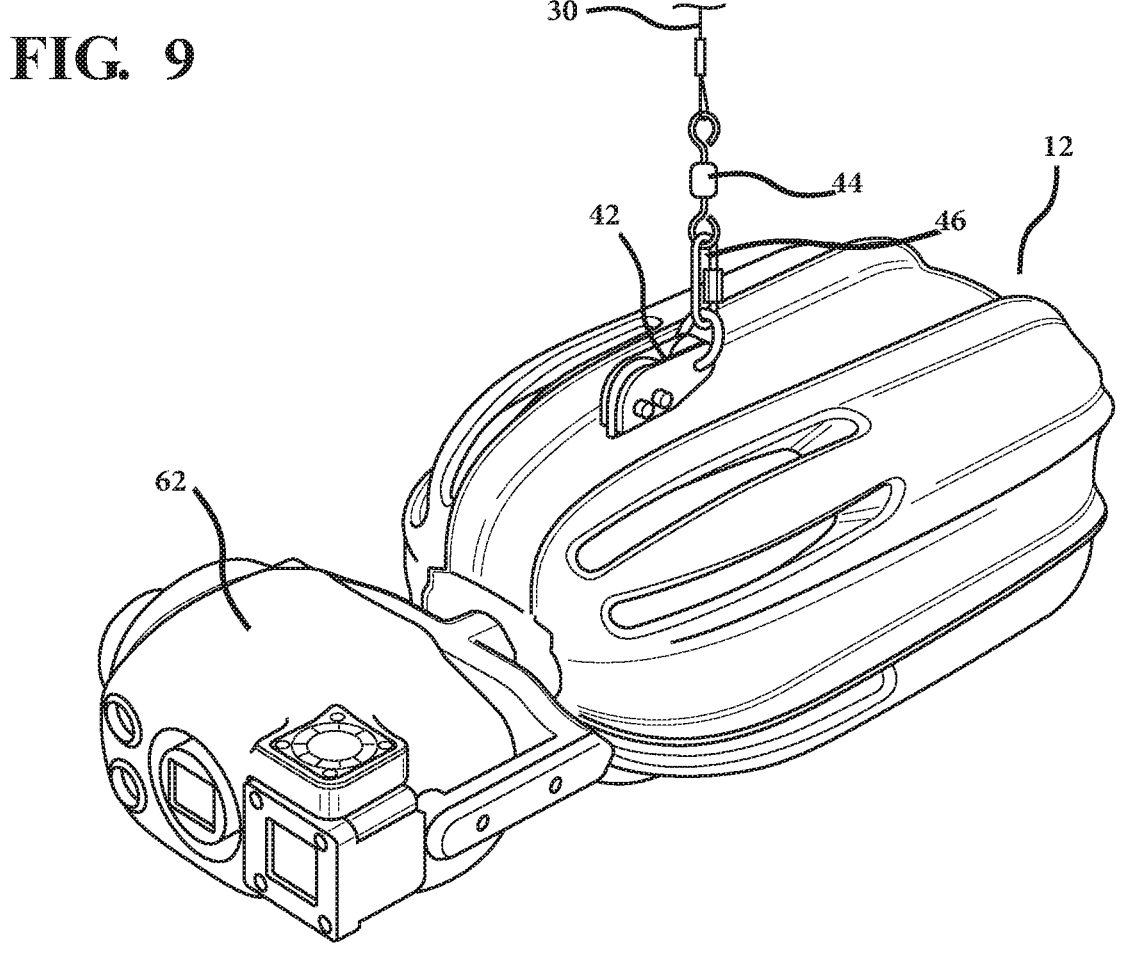
FIG. 9 illustrates a schematic perspective view of the self-stabilizing assembly illustrated in FIGS. 1-8, wherein the self-stabilizing assembly is attached to a winch cable.
Figure 10:
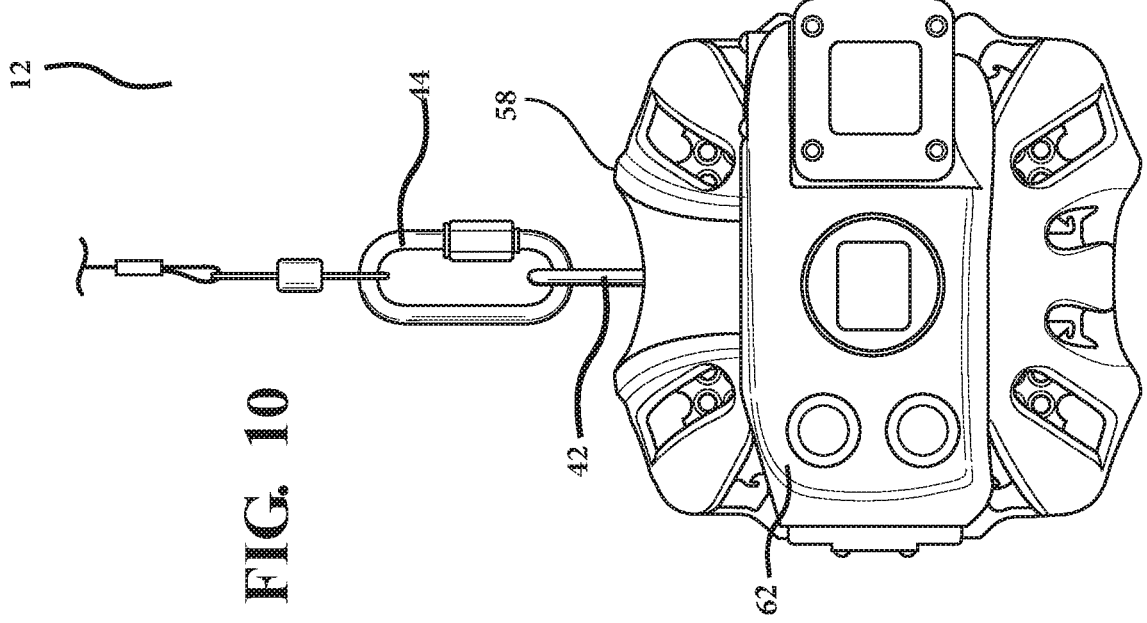
FIG. 10 illustrates a schematic front view of the self-stabilizing assembly attached to the winch cable as illustrated in FIG. 9.

As best seen in FIGS. 1, 9, and 10, and as a non-limiting example, one end of the winch cable 30 is attached to an anchor point 42 mounted to the top of the self-stabilizing assembly 12. In an embodiment, the anchor point 42 comprises a bearing. The anchor point 42 allows the self-stabilizing assembly 12 to spin freely, twist 360 degrees in either direction, and stabilize itself. The anchor point 30 helps minimize or remove the influence of the twisting or unwinding of the winch cable 30 from the winch spool 28.

In an embodiment, the winch cable 30 is attached to a swivel 44, wherein the swivel 44 is attached to a clip 46. The clip 46 is directly connected to the anchor point 42 on the top of the self-stabilizing assembly 12. The clip 46 may comprise a variety of high-strength clips, such as a carabiner clip, and the swivel 44 may comprise a variety of types of swivels, such as a ball bearing swivel capable of swiveling 360 degrees.

In an alternative embodiment, the winch cable 30 may be directly attached to the self-stabilizing assembly 12 without the use of any bearings or hard-mounted fixtures on the self-stabilizing assembly 12.

The self-stabilizing assembly 12 is configured to be deployed to allow for access, such as from the top or sides, of assets that are intended to be inspected. Specifically, the self-stabilizing assembly 12 may capture images and/or videos of different areas of interest of the assets. The self-stabilizing assembly 12 may be a manned or unmanned vehicle or vessel, such as an unmanned aerial vehicle (UAV), which may be motorized or non-motorized.

As best seen in FIG. 4, the self-stabilizing assembly 12 may move in a plurality of different axes, such as a first axis 52, a second axis 54, and a third axis 56. An operator may control and movement and direction of the self-stabilizing assembly 12 using the controller 50, wherein the controller 50 may be wireless. As a result, the operator may control the self-stabilizing assembly 12 from a distance The first axis 52 comprises a vertical axis that may be controlled by spooling the winch cable 30. The second axis 54 may rotate on the horizontal plane and allow the operator to spin the self-stabilizing assembly 12 in an unlimited 360-degree manner. The third axis 56 allows the operator to move the self-stabilizing assembly 12 up and down 180-degrees from the floor/ground to the ceiling.

The self-stabilizing assembly 12 comprises a housing 58, wherein the housing 58 may be made from a variety of suitable materials, including, but not limited to carbon fiber, plastic, and any combinations thereof. The housing 58 may have any suitable configuration, shape, or size. In an embodiment, the housing 58 may be formed as a single monolithic structure. In an alternative embodiment, the housing 58 may comprise a plurality of pieces that move relative to one another.

As best seen in FIGS. 5-9, the self-stabilizing assembly 12 also comprises a payload support structure 60, such as a gimbal, that provides support and stability to a payload device 62 mounted therein. The payload support structure 60 is pivotally attached to the housing 58 and may direct the movement of the payload device 62 by permitting movement of the payload device 62 with respect to up to two degrees of freedom (e.g., along one or two axes). For example, the payload device 62 may be adjusted up to 180 degrees straight up or down.

In some embodiments, the payload device 62 may include an imaging device configured to acquire and/or transmit one or more images of objects within the imaging device's field of view. Examples of an imaging device may include a camera, a video camera, a thermal camera, a drop camera, a gas detection camera, or any device having the ability to capture optic signals. The payload device 62 may be a 30X Optical zoom camera capable of capturing 360-degree views of an asset due to the ability of the self-stabilizing assembly 12 to yaw 360 degrees.

A non-imaging device may include any other devices, such as for collecting or distributing sound, particles, liquid, or the like. Examples of a non-imaging devices include LIDAR point clouds or sensor readings. In some embodiments, the self-stabilizing assembly 12 may include a plurality of payload devices 40.

Figure 18:
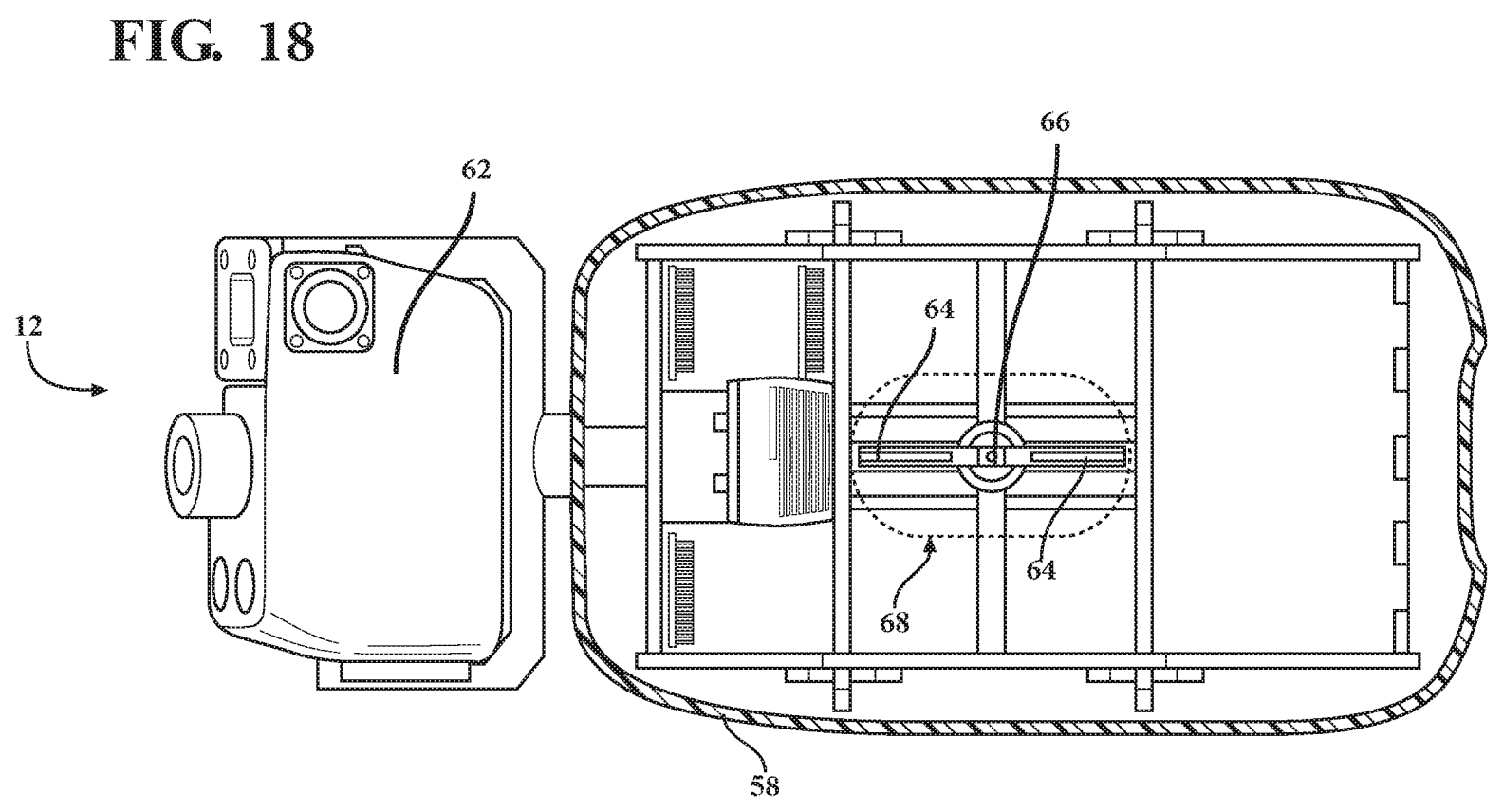

As best seen in FIG. 18, the self-stabilizing assembly 12 may include one or more rotatable members 64 within the housing 58. The rotatable members 64 radially extend from a base 66. The rotatable members 64 may be substantially-shaped like paddles/fins. The rotatable members 64 are configured to rotate/counter-rotate in order to control the heading of the self-stabilizing assembly 12 regardless of line twisting or airflow. The rotatable members 64 may be made from a variety of materials, including wood, plastic, aluminum, and any combinations thereof. Even though there are two rotatable members 64 depicted in the embodiment shown in FIG. 18, one of ordinary skill in the art would understand that the self-stabilizing assembly 12 may have exactly one rotatable member or more than two rotatable members.

Each of the rotatable members 64 may be coupled to an adjacent motor 68 also positioned within the housing 58. The motors 68 help create torque during the rotation/counter-rotation of the rotatable members 64. The motors 68 may receive power and/or position control signals from the controller 50. These signals determine whether the motors 68 should increase or decrease the rotation of the rotatable members 64 based on various factors, such as the desired movement needed to counter the output torque experienced by the self-stabilizing assembly 12 and the desired direction of the self-stabilizing assembly 12. The correction torque may help to prevent the self-stabilizing assembly 12 from moving in the direction of the output torque, thus maintaining the position of the self-stabilizing assembly 12 without the use of any anchor points, rigid objects, or hard-mounted fixtures attached thereto. Even though the embodiment of FIG. 18 depicts two electric motors 68 for balancing the output torque of the rotatable members 64, more or fewer motors are possible in other embodiments.

The rotatable members 64 may comprise any suitable shape, size, and configuration for rotating and stabilizing the self-stabilizing assembly 12. The combination of the rotatable members 64 and the motors 68 form a single axis unit to stabilize the payload device 62 from external forces while attached to the winch cable 30.

In an alternative embodiment, the self-stabilizing assembly 12 includes the rotatable members 64, but not an anchor point.

As best seen in FIGS. 5, 9, and 10, the self-stabilizing assembly 12 further comprises one or more sensors 70, such as one or more accelerometers, gyroscopes, velocity sensors, magnetometers, barometers, encoders, and the like. The sensors 70 may be positioned on the payload device 62 and/or along the winch cable 28. The sensors 70 may provide static and dynamic sensing data regarding one or more assets. For example, by sensing changes in the motion of the self-stabilizing assembly 12, the motors 68 may maintain a fixed direction of the self-stabilizing assembly 12. In another example, one of the sensors 70 on the winch cable 30 may provide exact lowered depth of the self-stabilizing assembly 12 by monitoring the amount that the winch cable 30 is spooled out.

The self-stabilizing assembly 12 also comprises additional electronic components, such as a video transmission system, communication system, and a power unit (e.g. battery system) positioned within the housing 58.

Figure 3:
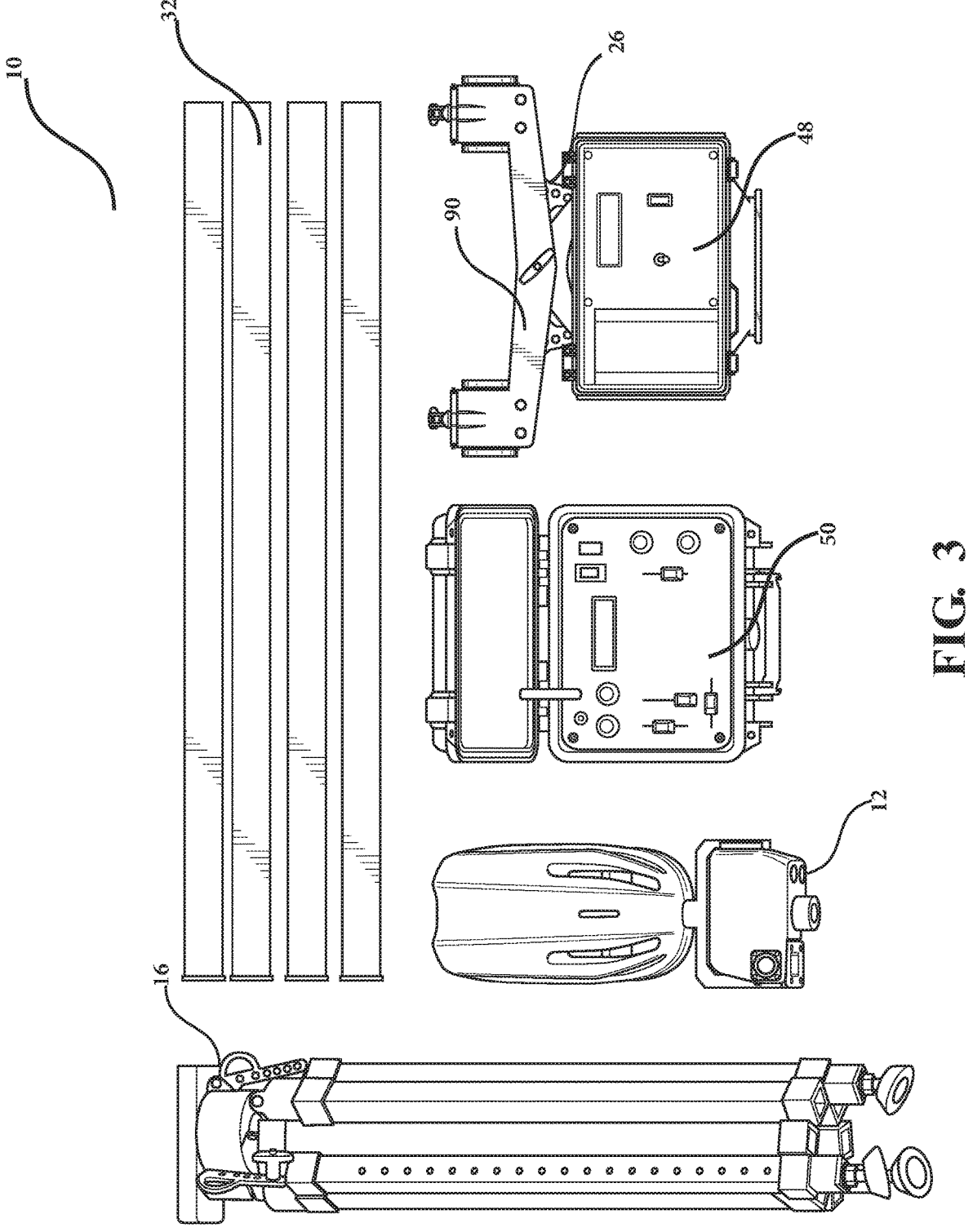
FIG. 3 illustrates a schematic perspective view of the components of the system illustrated in FIGS. 1 and 2.
Figure 11:
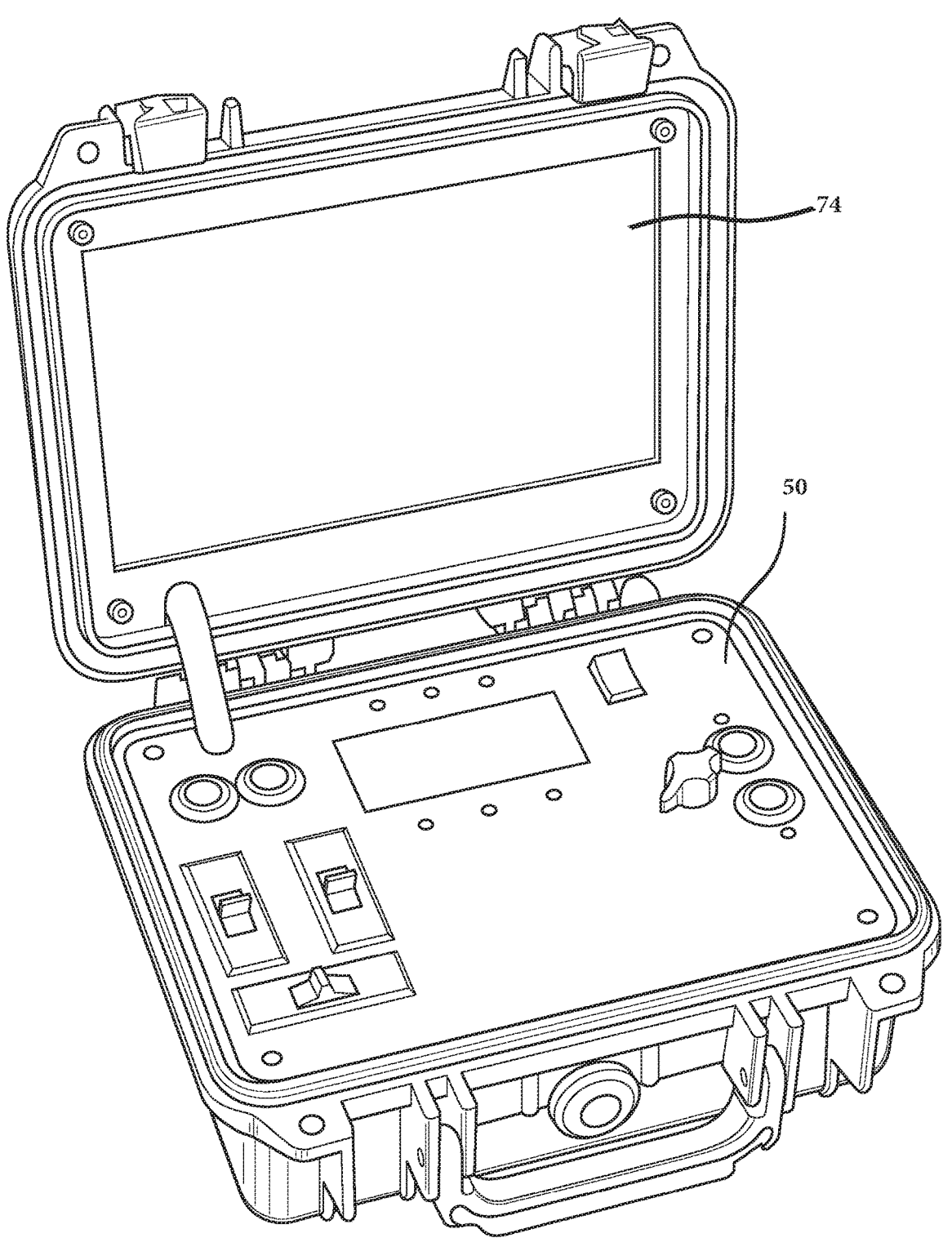
FIG. 11 illustrates a schematic perspective view of a controller of the system illustrated in FIGS. 1-3, wherein the controller is in a case.

As best seen in FIGS. 3 and 11, the controller 50 includes a display screen 74 and a plurality of buttons and control sliders to readily toggle between still photos and a video when the payload device 62 is a camera. As described herein, the controller 50 may be operated remotely from the self-stabilizing assembly 12 or may be inserted within controller mount 48.

FIGS. 19-24 illustrate views of a self-stabilizing assembly 112 according to an alternative embodiment of the disclosure. The self-stabilizing assembly 112 includes one or more of the same components as the self-stabilizing assembly 12 illustrated in FIGS. 1-18, but does not include any rotatable members or motors. As such, each of the components of the self-stabilizing assembly 112 illustrated in FIGS. 19-24 is not expressly identified herein.

Figure 19:
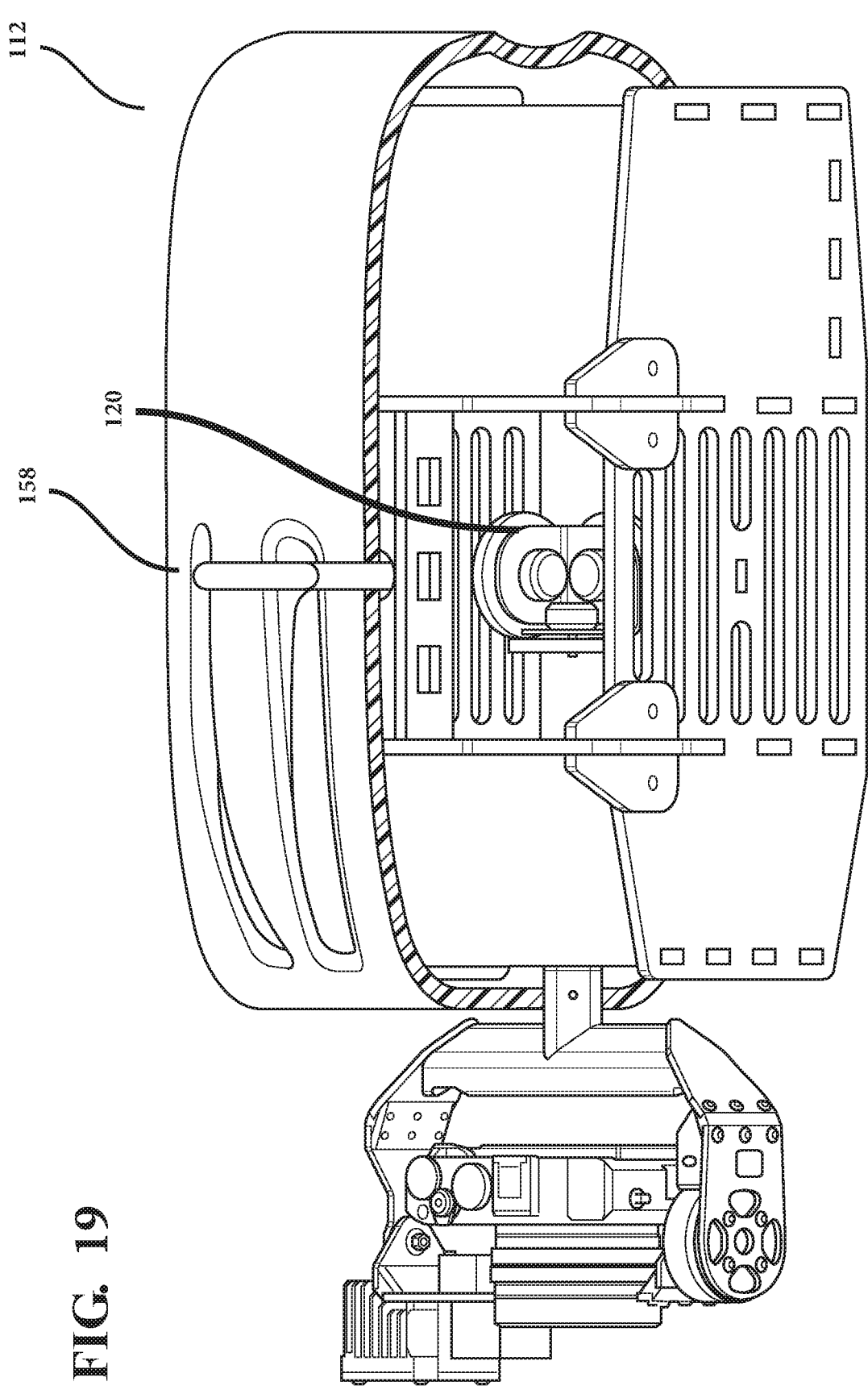
FIG. 19 illustrates a schematic sectional view of a self-stabilizing assembly according to an alternative embodiment.
Figure 20:
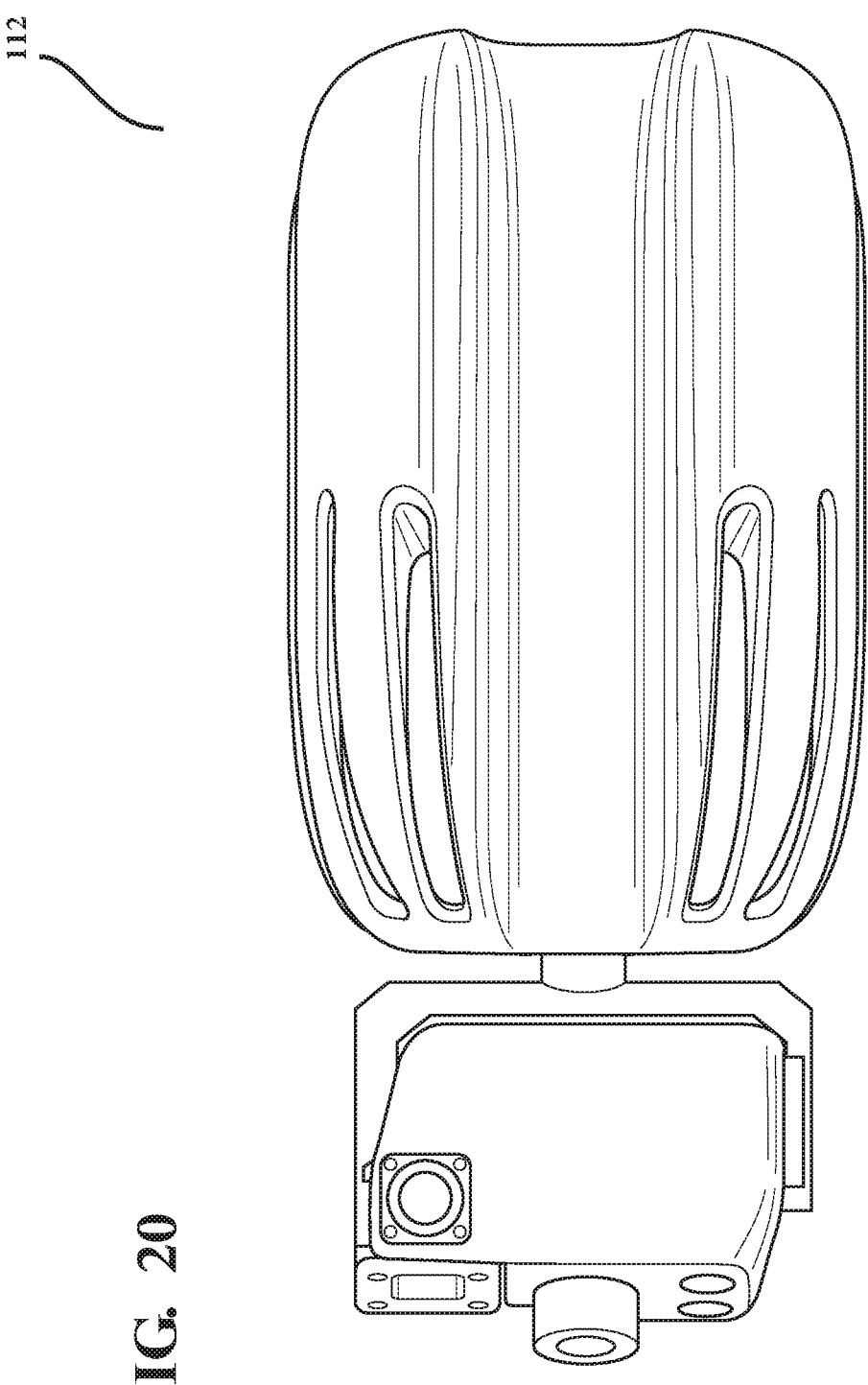
FIG. 20 illustrates a schematic bottom view of the self-stabilizing illustrated in FIG. 19.

As best seen in FIG. 19, the self-stabilizing assembly 112 comprises a housing 158 and a wheel unit assembly 120 positioned approximately within the center of the housing 158. In an embodiment, the wheel unit assembly 120 may be a triple-axis wheel unit assembly including an X-axis motor 140, a Y-axis motor 150, and a Z-axis motor 160. Each of the motors 140, 150, and 160 is coupled to a rotational wheel 130. Each of the rotational wheels 130 may be a reaction wheel, a momentum wheel, or a gyroscopic wheel. Each of the rotational wheels 130 are configured to rotate in a direction that is orthogonal to one another.

For example, the rotational wheel 130 coupled to the X-axis motor 140 may rotate forward and backwards along the X-axis direction. The rotational wheel 130 coupled to the Y-axis motor 150 may rotate forward and backwards along the Y-axis direction. The rotational wheel 130 coupled to the Z-axis motor 160 may rotate forward and backwards along the Z-axis direction.

The wheel unit assembly 120 communicates with the controller 50 and one or more of the motors 140, 150, and 160. The wheel unit assembly 120 receives power and/or position control signals from the controller 50. The signals drive the motors 140, 150, and 160, which then rotate the respective rotational wheel 130. The rotation of one or more the rotational wheels 130 induces motion of the self-stabilizing assembly 112.

The wheel unit assembly 120 may be used to better direct the self-stabilizing assembly 112 and minimize the influences of external forces, such as wind, movement of the support assembly 14, and twisting of cables. As a result, the wheel unit assembly 120 provides an alternate or supplemental means to provide control and stability to the self-stabilizing assembly 112, independent of rotatable members (e.g., paddles/fins).

Figure 21:
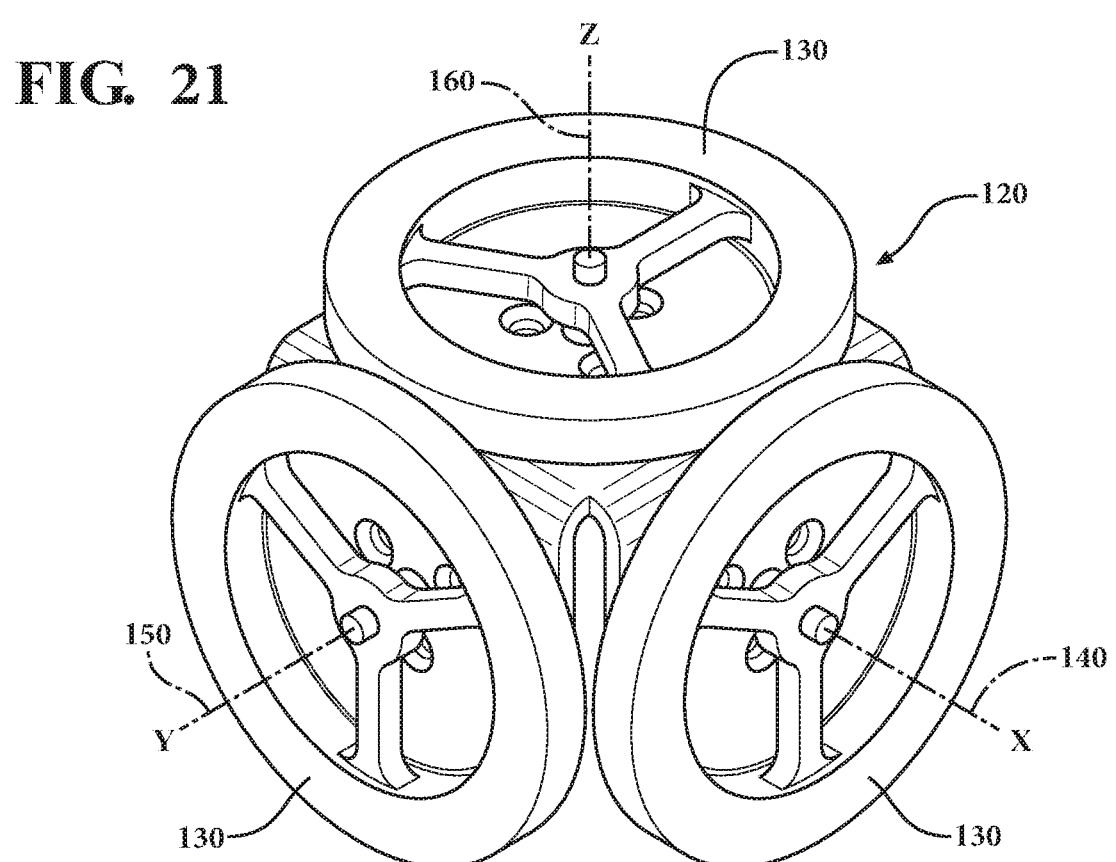
FIG. 21 illustrates a schematic perspective view of a triple-axis wheel unit of the self-stabilizing assembly illustrated in FIGS. 19 and 20.
Figure 22:
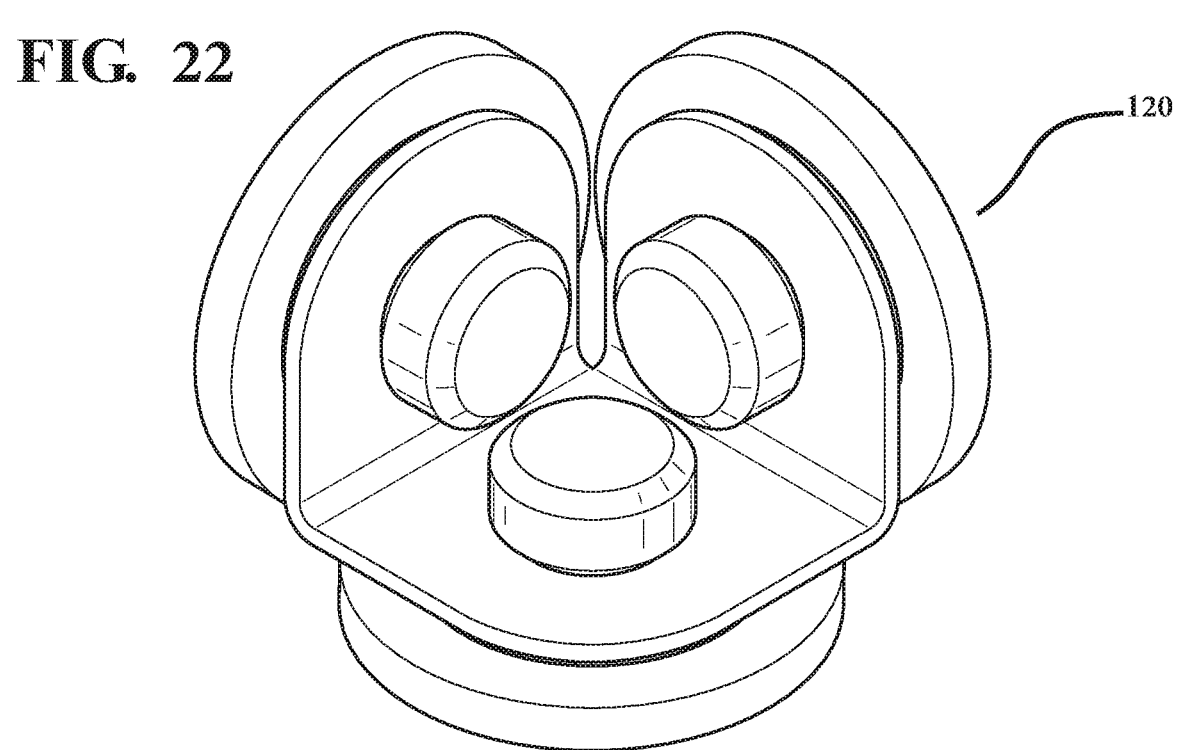
FIG. 22 illustrates a schematic interior view of the triple-axis wheel illustrated in FIGS. 19 and 21.
Figure 23:
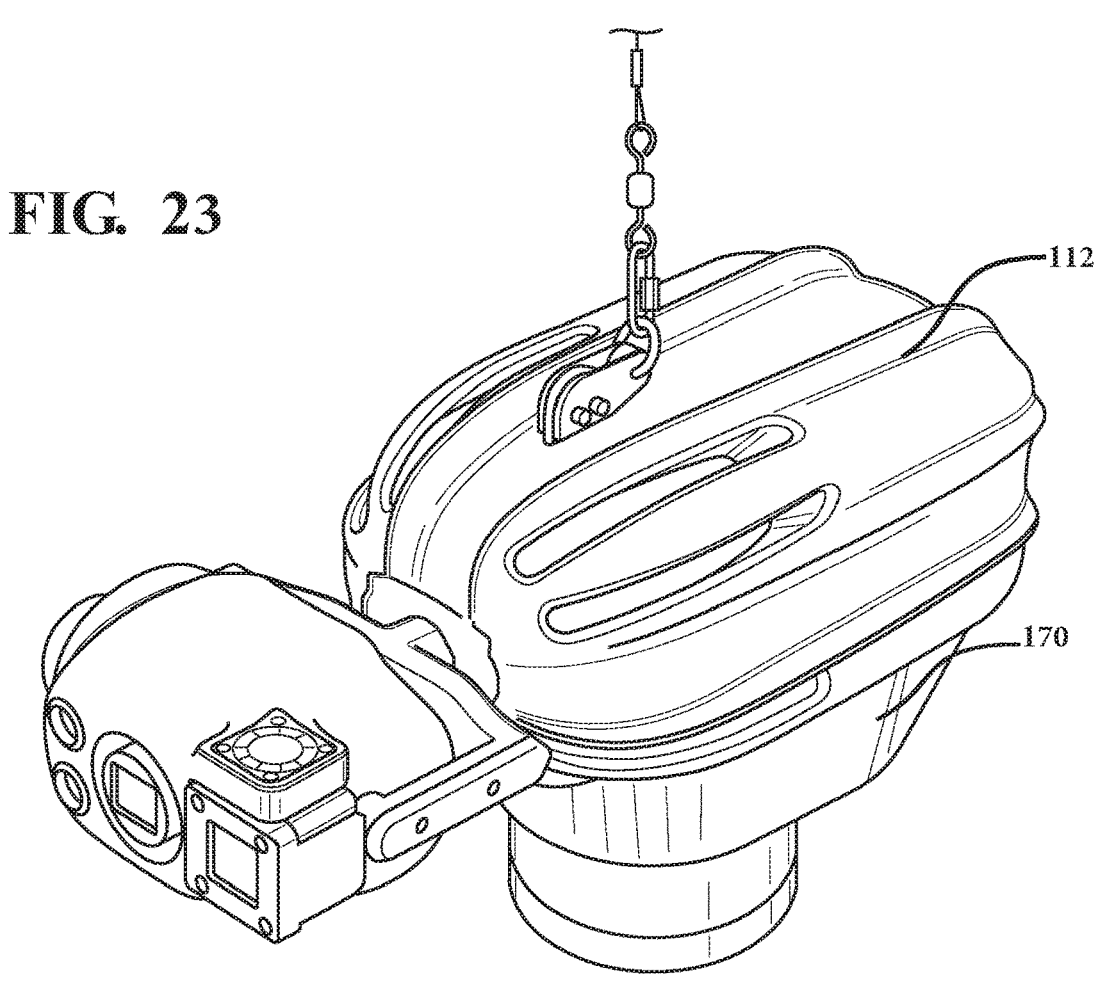
FIG. 23 illustrates a schematic perspective view of a LIDAR scanner attached to the self-stabilizing assembly illustrated in FIGS. 19-22.
Figure 24:
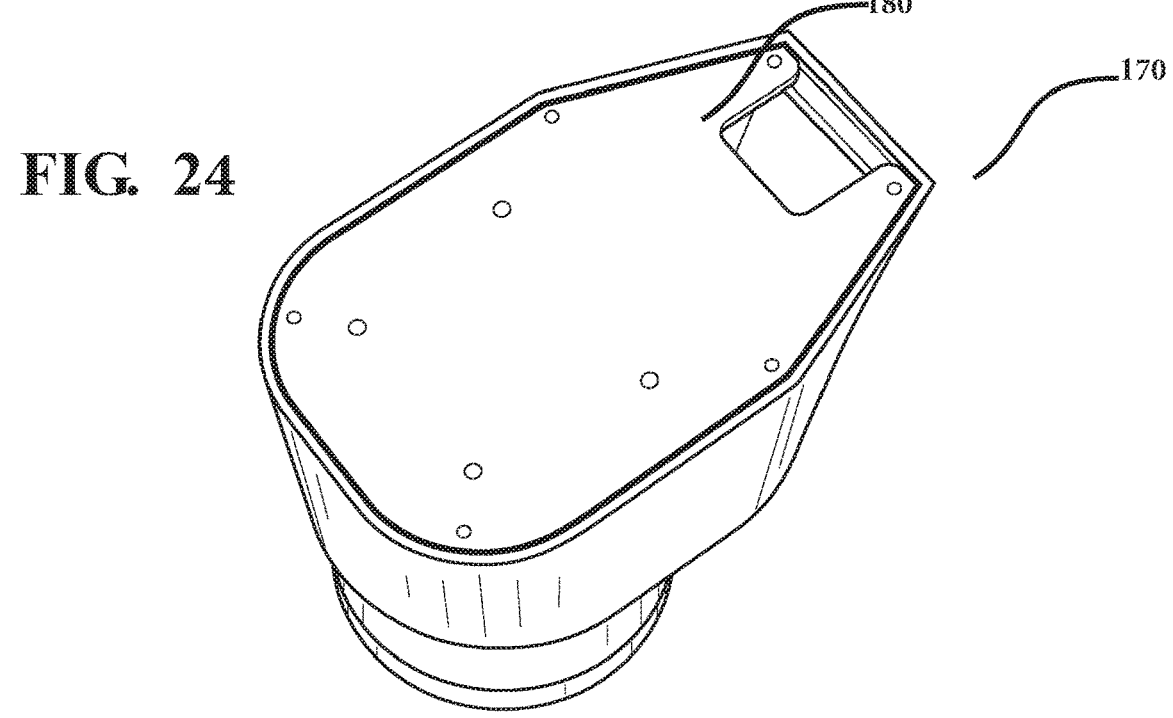
FIG. 24 illustrates a schematic perspective view of the LIDAR scanner illustrated in FIG. 23.

As best seen in FIGS. 23 and 24, a sensor 170 is attached to the bottom side of the housing 158 of the self-stabilizing assembly 112. In this embodiment, the sensor 170 is a LIDAR scanner. The LIDAR scanner 170 may be used by the self-stabilizing assembly 112 to gather information and data regarding the distances and shape of objects through the firing of narrow pulses of light from a laser. As shown in FIG. 21, the LIDAR scanner sensor 170 may include an adapter plate 180 on its bottom side.

One of ordinary skill in the art would appreciate, though, that other types of sensors may also be attached to the housing 158, such as a gas detection sensor or a radiation sensor. A gas detection sensor may be configured for monitoring the Lower Explosion Limit (LEL) of the environment being inspected by the self-stabilizing assembly 112 and a radiation sensor may be configured to monitor the dose rate of radiation exposure that the self-stabilizing assembly 112 is experiencing.

Some of the significant benefits of the present disclosure include providing a self-stabilizing assembly capable of being readily operable by any one person; preventing an operator from needing to physically break the plane of a confined space; providing a self-stabilizing assembly capable of attaching to a variety of payloads; allowing inspections to be fully completed without the need to continually replace batteries; and generating accurate and reliable real-time inspection data.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. An inspection system comprising;
   a first assembly comprising:
       a housing;
       one or more rotatable members positioned within the housing, wherein the rotatable members are configured to generate torque and control the heading of the first assembly;
       one or more motors coupled to the rotatable members, wherein the motors are configured to control the rotation of the rotatable members;
       a payload support structure pivotally attached to the housing;

a payload device mounted within the payload support structure, wherein the payload support structure is configured to stabilize and control the movement of the payload device;

a second assembly connected to the first assembly, wherein the second assembly comprises:

a support stand configured to support the first assembly, wherein the support stand comprises a tripod, and wherein the tripod comprises a plurality of pin locking stations;

an elongated arm pivotally attached to the support stand; and a winch assembly positioned on top of the support stand and attached to the elongated arm via a fastening assembly, wherein the winch assembly comprises a winch cable connected to the first assembly, and wherein the winch cable is configured to raise and lower the first assembly; and a controller for controlling the movement and direction of the first assembly.

2. The inspection system of claim 1, wherein a receiver plate is positioned on top of the tripod, wherein the winch assembly is attached to the receiver plate.

3. The inspection system of claim 1, wherein a bearing is positioned on top of the housing of the first assembly, and wherein the bearing is attached to the winch cable.

4. The inspection system of claim 3, wherein the bearing is connected to a clip, and wherein the clip is attached to a swivel, and wherein the swivel is attached to the winch cable.

5. The inspection system of claim 1, wherein the payload device is a camera.

6. The inspection system of claim 1, wherein one or more sensors are positioned on each of the payload device and the winch cable.

7. The inspection system of claim 1, wherein the fastening assembly comprises two opposing bushings, wherein a lever is mounted on top of each of the bushings.

* * * * *